(12) United States Patent
Watanabe et al.

(10) Patent No.: US 12,331,181 B2
(45) Date of Patent: Jun. 17, 2025

(54) DISPLAY DEVICE

(71) Applicant: Sharp Display Technology Corporation, Kameyama (JP)

(72) Inventors: Hisashi Watanabe, Kameyama (JP); Hirotoshi Yasunaga, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/370,022

(22) Filed: Sep. 19, 2023

(65) Prior Publication Data

US 2024/0141139 A1 May 2, 2024

(30) Foreign Application Priority Data

Oct. 26, 2022 (JP) ................. 2022-171316

(51) Int. Cl.
*C08K 9/00* (2006.01)
(52) U.S. Cl.
CPC .......... *C08K 9/00* (2013.01); *C08K 2201/005* (2013.01)
(58) Field of Classification Search
None
See application file for complete search history.

(56) References Cited

U.S. PATENT DOCUMENTS

| | | | |
|---|---|---|---|
| 5,742,367 A | 4/1998 | Kozaki | |
| 2009/0017082 A1* | 1/2009 | Morimitsu | C09D 5/028 427/205 |
| 2015/0091873 A1 | 4/2015 | Shimizu | |
| 2015/0202655 A1 | 7/2015 | Nakano et al. | |
| 2016/0085111 A1 | 3/2016 | Arita | |
| 2016/0187712 A1 | 6/2016 | Okamura | |
| 2019/0212598 A1 | 7/2019 | Shimizu | |

FOREIGN PATENT DOCUMENTS

| | | |
|---|---|---|
| JP | H08-304759 A | 11/1996 |
| JP | 2010-160994 A | 7/2010 |
| JP | 2013-037190 A | 2/2013 |
| JP | 2014-042892 A | 3/2014 |
| JP | 2015-068956 A | 4/2015 |
| JP | 5725581 B1 | 5/2015 |
| JP | 2016-061991 A | 4/2016 |
| JP | 2016-122255 A | 7/2016 |
| JP | 6667854 B1 | 3/2020 |
| WO | 2007/094253 A1 | 8/2007 |

OTHER PUBLICATIONS

"Black" Wikipedia page; https://en.wikipedia.org/wiki/Black.*
JP 6667854 (same as JP 2020-104316A) Machine Translation via EPO (Year: 2020).*
JP 2010-085647A Machine Translation via EPO (Year: 2010).*
JP 2015-068956Machine Translation via EPO (Year: 2015).*

* cited by examiner

*Primary Examiner* — Laura C Powers
(74) *Attorney, Agent, or Firm* — ScienBiziP, P.C.

(57) ABSTRACT

Provided is a display device that makes a desired pattern or the like visible in the non-display state and is capable of displaying a display image without allowing perception of the complementary color of the color of the pattern or the like. The display device includes: a dot matrix display panel; and a design layer disposed in front of a front surface side of the display panel. The design layer includes a design part that includes a binder resin and light-reflective colored particles dispersed in the binder resin. The light-reflective colored particles reflect light having a specific wavelength while absorbing light having a wavelength other than the specific wavelength.

17 Claims, 16 Drawing Sheets

DISPLAY DEVICE

CROSS-REFERENCE TO RELATED APPLICATIONS

The present application claims priority under 35 U.S.C. § 119 to Japanese Patent Application No. 2022-171316 filed on Oct. 26, 2022, the contents of which are incorporated herein by reference in their entirety.

BACKGROUND OF THE INVENTION

Field of the Invention

The present disclosure relates to display devices.

Description of Related Art

Considerations have recently been made to improve the design of display devices that display a desired image when their display screen is turned on. A considered technique of improving the design includes making a desired pattern or the like visible when a display panel is turned off.

JP 5725581 B, for example, discloses a printed material including: a base film; a first-color patterned layer provided on the base film and defined by a plurality of first-color dots; a second-color patterned layer provided on the first-color patterned layer and defined by a plurality of second-color dots; and a third-color patterned layer provided on the second-color patterned layer and defined by a plurality of third-color dots. Each of the first-color dots contains a binder for the first color and a plurality of first-color pigment chips dispersed within the binder for the first color. Each of the second-color dots contains a binder for the second color and second-color pigment chips dispersed within the binder for the second color. Each of the third-color dots contains a binder for the third color and third-color pigment chips dispersed within the binder for the third color. Each set of the first-color pigment chips, the second-color pigment chips, and the third-color pigment chips is any of a set of red interference pigment chips, a set of green interference pigment chips, and a set of blue interference pigment chips, each chip producing interference light of the corresponding color emitted as reflected light. The interference light waves are combined by additive mixing.

A typical display device displays a solid black color on its display screen when turned off. However, there has been a desire to display a pattern or the like on the display screen when the display device is turned off, for the purpose of decoration, for example. JP 5725581 B has therefore examined display of a specific pattern by reflecting ambient light using interference pigments.

An interference pigment is described with reference to FIG. 34. FIG. 34 is a schematic cross-sectional view showing a conventional interference pigment. An interference pigment is also called pearl pigment. As shown in FIG. 34, an interference pigment 100 includes particles each consisting of a base material 101 and a coating layer 102 covering the base material 101. The base material 101 can be a flake that is transparent to light having a wavelength in the visible spectrum. The coating layer 102 can be a metal oxide film higher in refractive index than the flake. The interference pigment 100 is dispersed in a binder resin and is applied to a base film 103 when used. Varying the thickness of the coating layer 102 allows adjustment of the color of the interference light to be perceived by the viewer.

As shown in FIG. 34, part of external light L4 is reflected at the interface between the air layer and the coating layer 102 and at the interface between the coating layer 102 and the base material 101 to be reflected light L5. Some other part of external light L4 is transmitted through the base material 101 and reflected by the surface of the base film 103 to be reflected light L6. This causes the viewer to perceive interference light of a pearlescent specific color, which is a combination of the reflected light L5 and the reflected light L6 of a color including the color of the base film 103.

JP 5725581 B relates to a printed material including first- to third-color patterned layers each including an interference pigment of any one of red, green, and blue, and discloses a method of combining interference lights of the respective colors through additive mixing. Examination made by the present inventors, however, revealed that when light is transmitted through a display device with its display panel disposed on the back surface side of the patterned layers containing interference pigments, the viewer sees the complementary colors of the interference pigments because the interference pigments transmit part of light emitted from the back surface side, thus resulting in a failure in expressing the desired color in transmissive display.

In response to the above issues, an object of the present invention is to provide a display device that makes a desired pattern or the like visible in the non-display state and is capable of displaying a display image without allowing perception of the complementary color of the color of the pattern or the like in the display state.

BRIEF SUMMARY OF THE INVENTION (1) One embodiment of the present invention is directed to a display device including: a dot matrix display panel; and a design layer disposed in front of a front surface side of the display panel, the design layer including a design part that includes a binder resin and light-reflective colored particles dispersed in the binder resin, the light-reflective colored particles reflecting light having a specific wavelength while absorbing light having a wavelength other than the specific wavelength.

(2) In an embodiment of the present invention, the display device includes the structure (1), and the light-reflective colored particles each include a piece of metal coated with a pigment.

(3) In an embodiment of the present invention, the display device includes the structure (1) or (2), and the light-reflective colored particles include light-reflective colored particles of two or more colors that include pigment coatings of different colors.

(4) In an embodiment of the present invention, the display device includes any one of the structures (1) to (3), and an average particle size of the light-reflective colored particles is 30 µm or smaller.

(5) In an embodiment of the present invention, the display device includes any one of the structures (1) to (4), the design part includes a region containing the light-reflective colored particles and a region not containing the light-reflective colored particles, and a ratio between the region containing the light-reflective colored particles and the region not containing the light-reflective colored particles is changed to express color shades.

(6) In an embodiment of the present invention, the display device includes the structure (5), the design part further includes a region containing a black colored material and a region not containing the black colored material, and a proportion of the region containing the black colored material is low in a region in which a proportion of the region containing the light-reflective colored particles is high, and a proportion of the region containing the black colored material is high in a region in which a proportion of the region containing the light-reflective colored particles is low.

(7) In an embodiment of the present invention, the display device includes the structure (6), the light-reflective colored particles each include a piece of metal coated with a pigment of a first color, the black colored material includes light-reflective black colored particles each including a piece of the metal coated with a black pigment, and a difference in concentration between the light-reflective colored particles and the light-reflective black colored particles in the binder resin is 5% by mass or less.

(8) In an embodiment of the present invention, the display device includes any one of the structures (1) to (4), and the design part includes layers containing light-reflective colored particles of different colors stacked in a thickness direction of the design part.

(9) In an embodiment of the present invention, the display device includes the structure (8), and the layers include a layer containing light-reflective red colored particles, a layer containing light-reflective green colored particles, and a layer containing light-reflective blue colored particles.

(10) In an embodiment of the present invention, the display device includes the structure (9), and the layers further include a layer containing light-reflective white colored particles.

(11) In an embodiment of the present invention, the display device includes any one of the structures (1) to (4), and the design part is divided in an in-plane direction into regions containing light-reflective colored particles of different colors.

(12) In an embodiment of the present invention, the display device includes any one of the structures (1) to (11), and the display device includes no air layer between the display panel and the design layer.

(13) In an embodiment of the present invention, the display device includes any one of the structures (1) to (12), the display device includes a transparent base material disposed in front of the front surface side of the display panel, and the display device includes the design layer on a front surface side or a back surface side of the transparent base material.

(14) In an embodiment of the present invention, the display device includes any one of the structures (1) to (13), and the display device further includes a polarizer and a phase difference plate sequentially from the display panel side between the display panel and the design layer.

(15) In an embodiment of the present invention, the display device includes any one of the structures (1) to (13), and the display device includes a polarizer in front of the front surface side of the display panel, and the display device includes the design layer on a front surface side or a back surface side of the polarizer.

The present invention can provide a display device that makes a desired pattern or the like visible in the non-display state and is capable of displaying a display image without allowing perception of the complementary color of the color of the pattern or the like.

DETAILED DESCRIPTION OF THE INVENTION

Hereinafter, the present invention is described in more detail based on embodiments with reference to the drawings. The present invention is not limited to these embodiments. The configurations of the embodiments may be combined or modified as appropriate within a scope not departing from the gist of the present invention.

The "display state" herein means, unless otherwise specified, a state where light is emitted from the display panel side (i.e., from the display panel or from behind the display panel) and then transmitted through the design layer. In the display state, the display panel (self-luminous panel) or the backlight is turned on (the power is on) and the desired display image is displayed on the display panel. The "non-display state" herein means, unless otherwise specified, a state where light is not emitted from the display panel side. In the non-display state, the display panel or the backlight is turned off (the power is off). The non-display state is also referred to as a reflective state because, basically, light is not emitted toward the viewer, so that the viewer observes reflected light of external light.

The expression that two directions are orthogonal to each other herein means that the angle formed between the two directions preferably falls within the range of 90°±3°, more preferably the range of 90°±1°, still more preferably the range of 90°±0.5°. The expression that two directions are parallel to each other herein means that the angle formed between the two directions preferably falls within the range of 0°±3°, more preferably the range of 0°±1°, still more preferably the range of 0°±0.5°.

The "front surface side" herein means a surface facing the viewer when the viewer observes the display device and is also referred to as a "viewer side". The "back surface side" herein means a surface opposite to the viewer side.

Embodiment 1

A display device of Embodiment 1 includes a dot matrix display panel, and a design layer disposed in front of the front surface side of the display panel. The design layer includes a design part that includes a binder resin and light-reflective colored particles dispersed in the binder resin. The light-reflective colored particles reflect light having a specific wavelength while absorbing light having a wavelength other than the specific wavelength.

Figure 1:
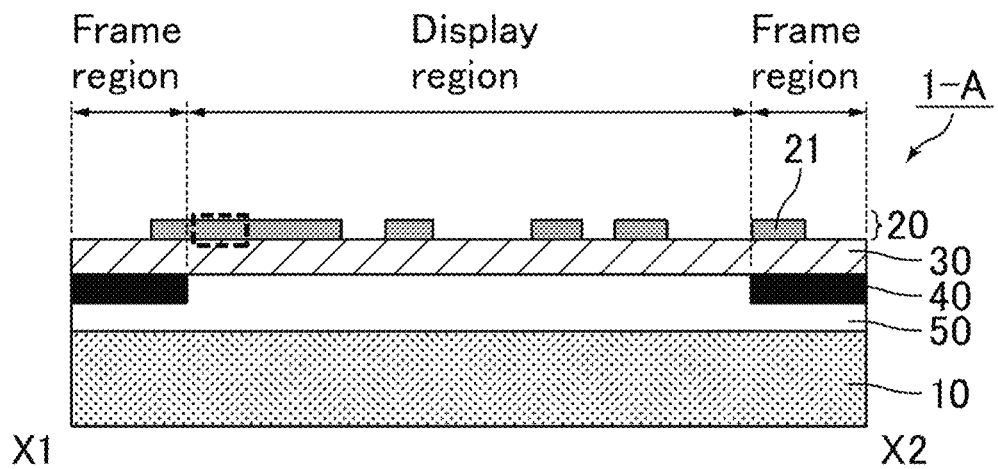
FIG. 1 is a schematic cross-sectional view showing an example of a display device of Embodiment 1.
Figure 2:
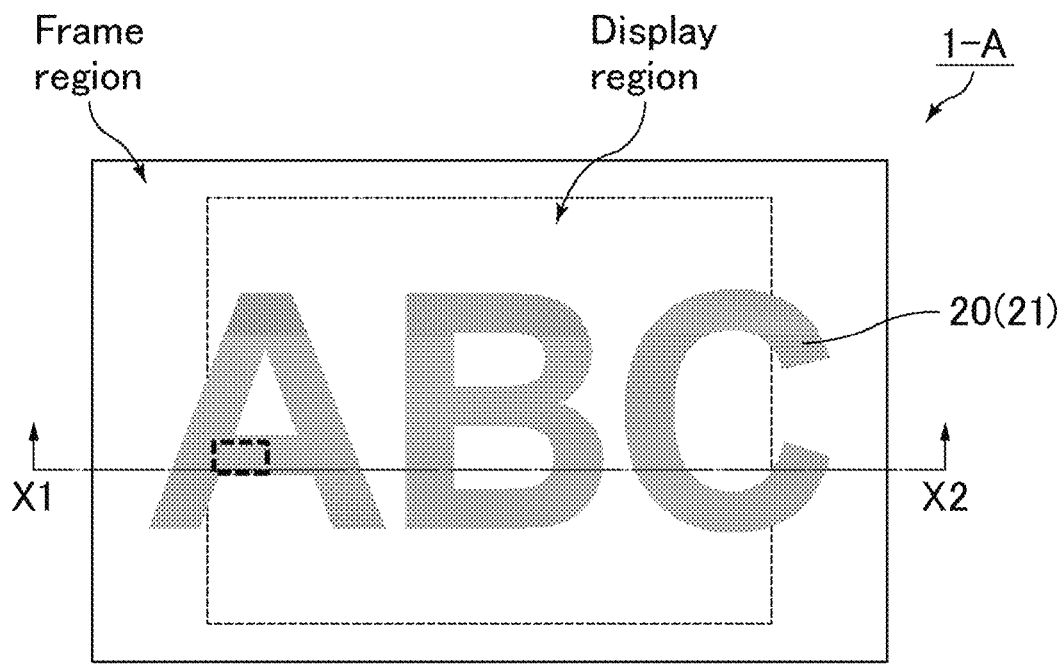
FIG. 2 is a schematic plan view of the display device shown in FIG. 1.

FIG. 1 is a schematic cross-sectional view showing an example of a display device of Embodiment 1. FIG. 1 is also a schematic plan view of the display device in the non-display state. FIG. 2 is a schematic plan view of the display device shown in FIG. 1. FIG. 1 is also a schematic cross-sectional view taken along the X1-X2 line in FIG. 2. As shown in FIG. 1, a display device 1-A of Embodiment 1 includes a display panel 10 and a design layer 20. Embodiment 1 shows an example where the display device 1-A includes a transparent base material 30 in front of the front surface side of the display panel 10.

(Display Panel)

The display panel 10 is a dot matrix display panel. A dot matrix display panel has a structure in which display units are arranged in the row direction and the column direction. Non-limiting examples of the display panel 10 include liquid crystal panels, OLED panels, and other known panels.

Examples of the liquid crystal panels include those having a structure in which a liquid crystal layer is sandwiched between a pair of substrates. The pair of substrates may be an active matrix substrate with thin film transistors (TFTs) or other switching elements and a color filter substrate with color filters.

The active matrix substrate may have a configuration including gate lines, source lines intersecting the gate lines, TFTs disposed at or near the intersections of the gate lines and the source lines, and pixel electrodes electrically connected to the TFTs. The active matrix substrate or the color filter substrate may include a counter electrode. The display device may include a gate diver to which the gate lines are connected, a source driver to which the source lines are connected, and other drive circuits. The TFTs disposed in the respective pixels are controlled to be turned on or off via the gate driver. When TFTs are turned on, voltage is applied to the corresponding pixel electrodes via the source driver to generate electric fields between the pixel electrodes and the counter electrode, which control the alignment of liquid crystal molecules in the liquid crystal layer to display an image.

Although the display panel above is an active display panel, the display panel may be a passive display panel including no TFTs but pixels at the intersections of conductive lines arranged in a grid pattern. In the case where the display panel 10 is a liquid crystal panel, a backlight may be disposed on or behind the back surface side of the liquid crystal panel. The backlight is not limited and may be a common backlight. For example, the backlight may be an edge-lit one with a light source at the edge of a light guide plate or may be a direct-lit one with many light sources in a plane and a diffuser plate used for an increase in uniformity of light.

A self-luminous panel is a panel that includes a light-emitting element inside and can emit light by itself, thus requiring no external light source such as a backlight. The self-luminous panel can be a known one, such as an organic light emitting diode (OLED) panel including OLEDs. A light emitting diode, for example, corresponds to the light-emitting element.

The configuration of the light emitting diode is not limited, and may be, for example, a stack of a cathode, an electron transport layer, a light-emitting layer, a hole transport layer, and an anode arranged in this order. The light-emitting layer may include a fluorescent material, a phosphorescent material, or another material as the light emitting material.

(Design Layer)

The design layer 20 is disposed in front of the front surface side of the display panel 10. The design layer 20 includes a design part 21 having a specific pattern to be perceived by the viewer in the non-display state. Non-limiting examples of the specific pattern include geometric patterns with a design, wood grain patterns, specific character strings, and company logos. FIG. 2 shows an example where the letters "ABC" are perceived in the non-display state.

Figure 3:
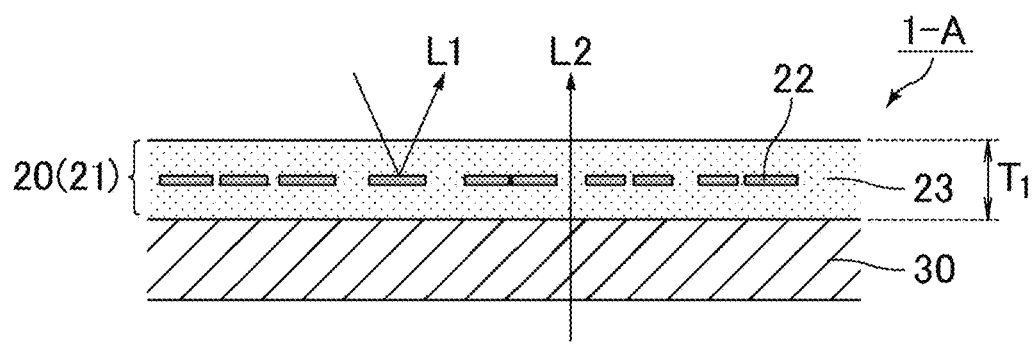
FIG. 3 is a partially enlarged schematic cross-sectional view of the design part shown in FIG. 2.
Figure 4:
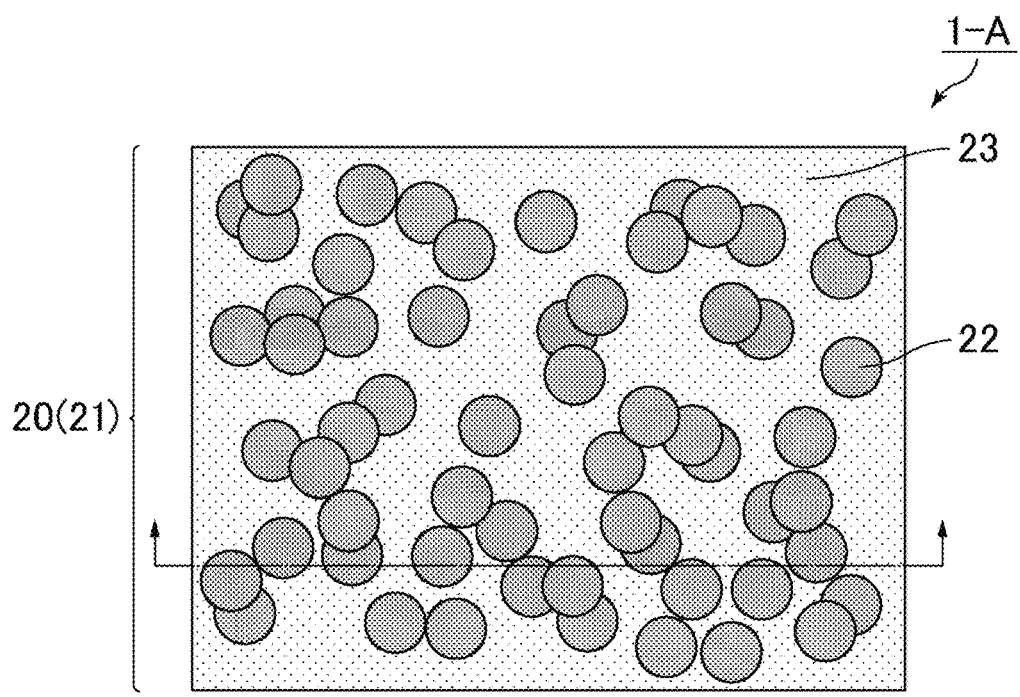
FIG. 4 is a partially enlarged schematic plan view of the design part shown in FIG. 2.

FIG. 3 is a partially enlarged schematic cross-sectional view of the design part shown in FIG. 2. FIG. 4 is a partially enlarged schematic plan view of the design part shown in FIG. 2. FIG. 3 and FIG. 4 are enlarged schematic views of the parts surrounded by the dotted line in FIG. 1 and FIG. 2, respectively. As shown in FIG. 3 and FIG. 4, the design part 21 includes a binder resin 23 and light-reflective colored particles 22 dispersed in the binder resin 23.

The binder resin 23 is used to make the light-reflective colored particles 22 dispersed therein and forms a film after dried. The design layer 20 can be formed by printing with an ink in which the light-reflective colored particles 22 are dispersed in the binder resin 23. With the binder resin 23, the viscosity of the ink and the adhesiveness to a printing material are adjustable.

Examples of the binder resin 23 include acrylic resin and epoxy-based resin. The binder resin 23 is preferably transparent, and preferably has, for example, a total light transmittance of 90% or higher when the binder resin alone is cured.

Examples of the ink include ultraviolet-curable ink and heat-curable ink. When the base material of the light-reflective colored particles 22 is metal, the base material may reflect ultraviolet rays to leave uncured sites in the resulting design layer 20. The ink is therefore preferably a heat-curable ink. In other words, the binder resin 23 is preferably a heat-curable resin.

For example, the design part 21 may be partially printed using an ink including the binder resin 23 and the light-reflective colored particles 22. Non-limiting examples of the printing method include gravure printing, screen printing, and inkjet printing. The thickness $T_1$ of the design layer 20 is not limited and may be, for example, 10 μm or greater and 50 μm or smaller.

The design layer 20 may be disposed on the front surface side or the back surface side of the transparent base material 30. Although FIG. 1 shows an example where the design layer 20 is disposed on the front surface side of the transparent base material 30, the design layer 20 may be disposed on the back surface side of the transparent base material 30. In order to express the metallic texture of the design part 21 clearly, the design layer 20 is preferably disposed on the front surface side of the transparent base material 30. In order to protect the design part 21, the design layer 20 is preferably disposed on the back surface side of the transparent base material 30.

Although not shown, when the design layer 20 is disposed on the front surface side of the transparent base material 30, a hard coat layer may be disposed on the viewer side of the design layer 20. The hard coat layer is preferably transparent (e.g., the total light transmittance is 90% or higher). With the hard coat layer, scratch resistance can be enhanced and thus the design layer 20 can be protected. Examples of the hard coat layer include coating layers made of acrylic resin or epoxy-based resin, for example.

The light-reflective colored particles 22 reflect light having a specific wavelength and absorb light having a wavelength other than the specific wavelength. The specific wavelength is the wavelength of light of the color to be perceived by the viewer in the non-display state among the wavelengths in the visible spectrum (380 nm to 780 nm). The wavelength other than the specific wavelength is a wavelength other than the specific wavelength among the wavelengths in the visible spectrum. The light-reflective colored particles 22, unlike the interference pigment, absorb light having a wavelength other than the specific wavelength without transmitting the light. Thus, even when light incident on the display panel 10 in the display state is emitted from the viewer side, the desired image can be displayed by transmissive display without emitting light of the complementary color of the color to be perceived by the viewer in the non-display state.

Figure 5:
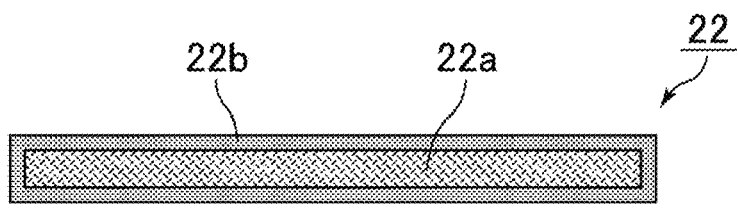
FIG. 5 is a schematic cross-sectional view showing an example of a light-reflective colored particle.

FIG. 5 is a schematic cross-sectional view showing an example of a light-reflective colored particle. As shown in FIG. 5, the light-reflective colored particles 22 are preferably those in each of which a piece of metal 22a is coated with a pigment 22b. Examples of the light-reflective colored particles 22 include "FRIEND COLOR®" available from Toyo Aluminium K.K. The light-reflective colored particles 22 may be those in each of which the pigment 22b is further coated with an acrylic resin or another polymer.

The pieces of metal 22a are preferably those that reflect visible light. Examples thereof include aluminum, nickel, titanium, stainless steel, and alloys of any of these metals.

The pigment 22b may be an organic pigment or an inorganic pigment, but is preferably an organic pigment. Examples of the organic pigment include phthalocyanine, phthalocyanine halide, quinacridone, diketopyrrolopyrrole, isoindolinone, azomethine metal complexes, indanthrone, perylene, perinone, anthraquinone, dioxazine, benzimidazolone, condensed azo pigments, triphenylmethane, quinophthalone, and anthrapyrimidine. Examples of the inorganic pigment include titanium oxide, iron oxide, carbon black, and bismuth vanadate.

Primary color pigments such as red, green, blue, yellow, and black pigments may be mixed at a specific ratio to prepare the desired color. Examples of the method of preparing the color include mixing multiple types of pigments. Herein, the color of the light-reflective colored particles means the color perceived by the viewer in the non-display state (reflective display).

The average particle size of the light-reflective colored particles 22 is preferably 30 μm or smaller. With an average particle size of 30 μm or smaller, glaring can be reduced or prevented. The lower limit of the average particle size is preferably 10 μm. The average particle size is more preferably 25 μm or smaller, still more preferably 20 μm or smaller. Herein, the average particle size of the light-reflective colored particles means the median diameter ($D_{50}$). The average particle size is measurable by the laser diffraction particle size distribution analysis.

The display device 1-A may include a transparent base material 30 in front of the front surface side of the display panel 10. The transparent base material 30 is a base material transparent to light. The transparent base material 30 may be made of, for example, glass, acrylic, polycarbonate, or polyethylene terephthalate.

The surface of the transparent base material 30 may be flat or curved. When the surface of the transparent base material 30 is curved, the transparent base material 30 may be curved toward the front surface side or toward the back surface side. When the surface of the transparent base material 30 is curved, the radius of curvature of the outermost surface of the transparent base material 30 may be, for example, from 50 cm to 150 cm.

In order not to decrease the luminance of the display device, the transmittance of the transparent base material 30 is preferably high. For example, the total light transmittance is 90% or higher. In order to more clearly display a display image in the display state, the haze is preferably low. For example, the haze is 10% or lower. The transmittance herein means the total light transmittance measured by a method in conformity with JIS K 7361-1. The haze is measurable by a method in conformity with JIS K 7136.

As shown in FIG. 1, the display panel 10 may include a display region that displays desired images in the display state and a frame region surrounding the display region. In the display region, the light-emitting elements described above are arranged. In the frame region, a bezel, sealants, drivers, drive circuits, and other components may be arranged. In a region overlapping the frame region, the black layer 40 may be disposed. With the black layer 40 disposed, components disposed in the frame region of the display device can be made invisible. The black layer 40 may be a print portion printed with a black pigment, e.g., carbon black, or a black dye, or may be light-shielding tape.

Figure 6:
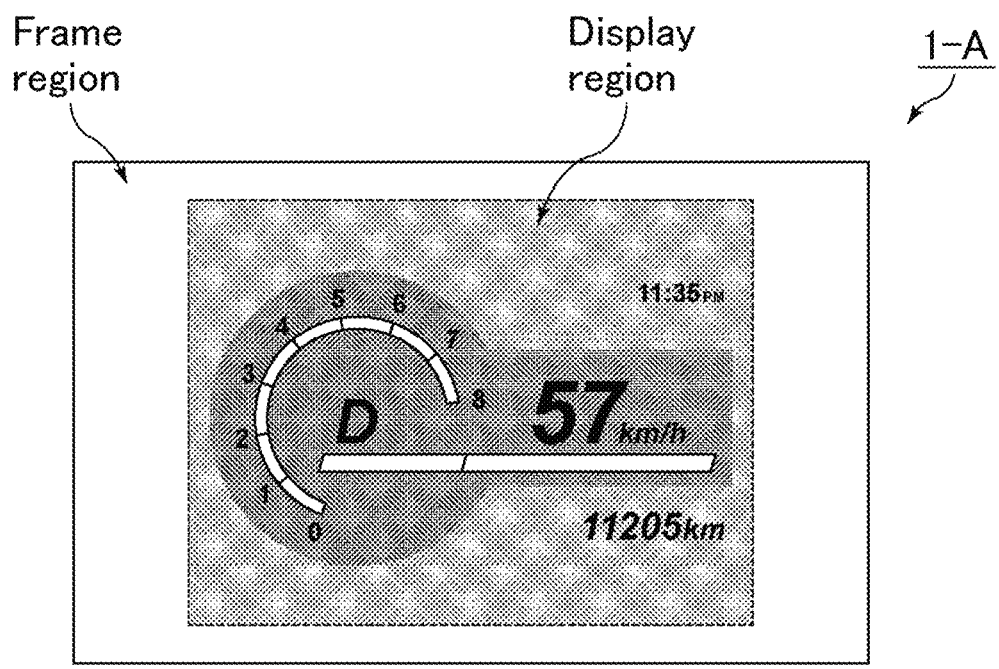
FIG. 6 is a schematic plan view of a display device displaying an image in the display state.

A display method for the display device of Embodiment 1 is described below with reference to FIG. 1, FIG. 3, and FIG. 6. FIG. 6 is a schematic plan view of a display device displaying an image in the display state.

(Non-Display State)

In the non-display state (reflective state), the display panel 10 or the backlight disposed on or behind the back surface of the display panel 10 is turned off. Display light is not emitted from the display panel 10 side toward the design layer 20, while light (external light) is incident on the viewer side of the design layer 20. As shown by the arrow L1 in FIG. 3, light (external light) incident on the viewer side of the design layer 20 is reflected by the light-reflective colored particles 22, and then emitted toward the viewer. As a result, as shown in FIG. 1, the design part 21 (the letters ABC in FIG. 1) including the light-reflective colored particles 22 is perceived in a specific color.

The design part 21 may not be disposed in the entire design layer 20 and may be partially disposed on the transparent base material 30. In Embodiment 1, parts other than the design part 21 have not undergone printing or other processing, and thus appear black as in a typical display device in the non-display state. Yet, as will be described in Embodiment 3, a region other than the design part 21 may contain the light-reflective colored particles 22.

(Display State)

In the display state, as shown by the arrow L2 in FIG. 3, light emitted from the display panel 10 side passes through the transparent base material 30 and is emitted toward the viewer through gaps between the light-reflective colored particles 22. The light-reflective colored particles 22 do not transmit light unlike interference pigments, so that the viewer can see the displayed display image without perceiving the complementary color.

In the display state, the liquid crystal panel displays the desired display image and the viewer sees the display image through the design layer 20. The image to be displayed on the display panel 10 in the display state is not limited, and may be a vehicle speedometer, for example. As shown in FIG. 6, in the display state, the viewer can see the desired display image (speedometer) without the letters ABC in FIG. 1 seen through.

Modified Example

Figure 7:
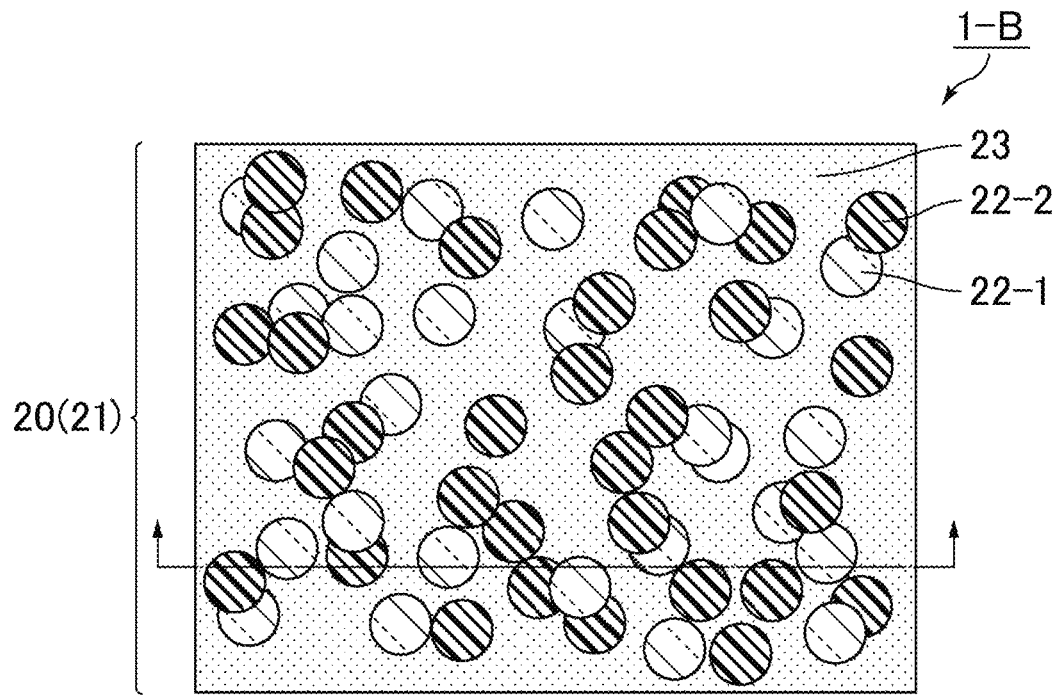
FIG. 7 is a partially enlarged schematic plan view of a design part of a modified example using light-reflective colored particles of two colors.
Figure 8:
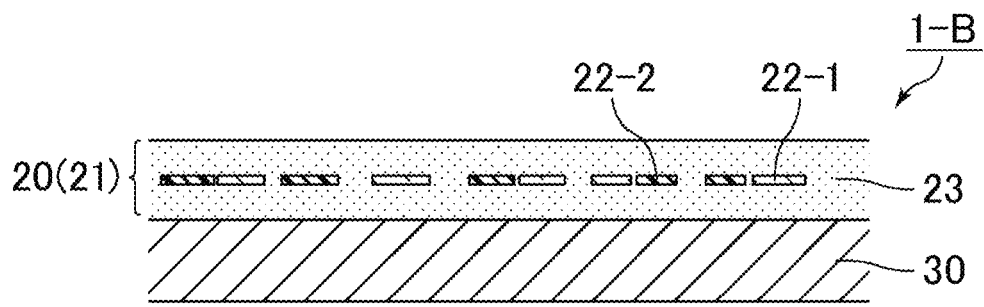
FIG. 8 is a partially enlarged schematic cross-sectional view of the design part of the modified example.

FIG. 7 is a partially enlarged schematic plan view of a design part of a modified example using light-reflective colored particles of two colors. FIG. 8 is a partially enlarged schematic cross-sectional view of the design part of the modified example. As shown in FIG. 7 and FIG. 8, light-reflective colored particles in a display device 1-B of a modified example contain light-reflective colored particles 22-1 and 22-2 of two or more colors that include pigment coatings of different colors. In Embodiment 1, the desired image can be more accurately expressed when light-reflective colored particles of a single color are used. Still, for example, multiple colors with similar hues may be employed such as in a case where the light-reflective colored particles 22-1 are red and the light-reflective colored particles 22-2 are yellow.

Embodiment 2

Figure 9:
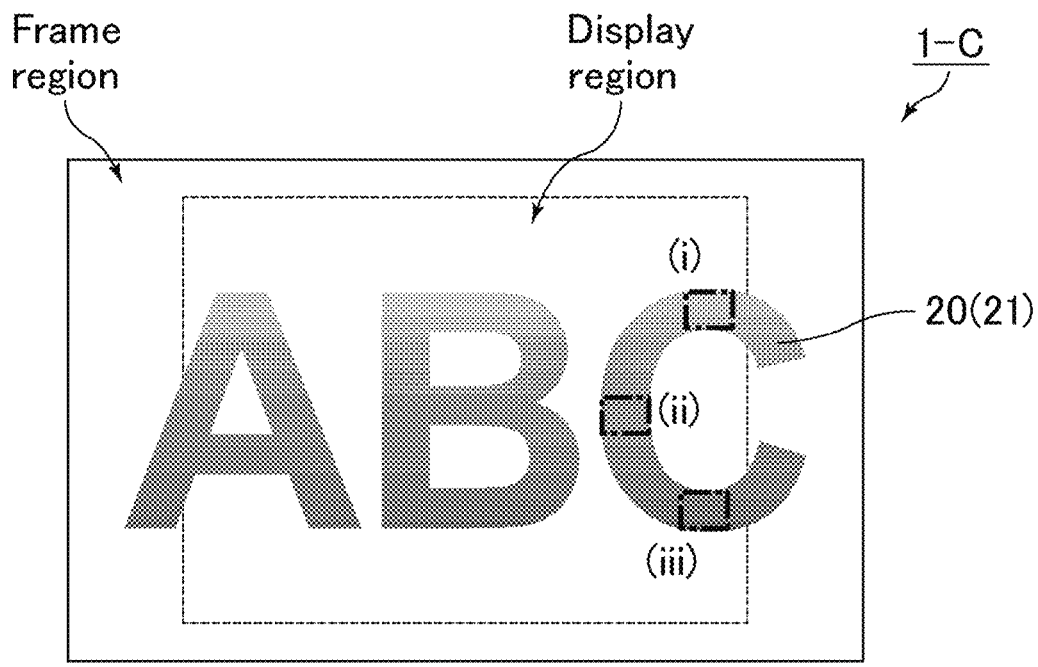
FIG. 9 is a schematic cross-sectional view showing an example of a display device of Embodiment 2.
Figure 10:
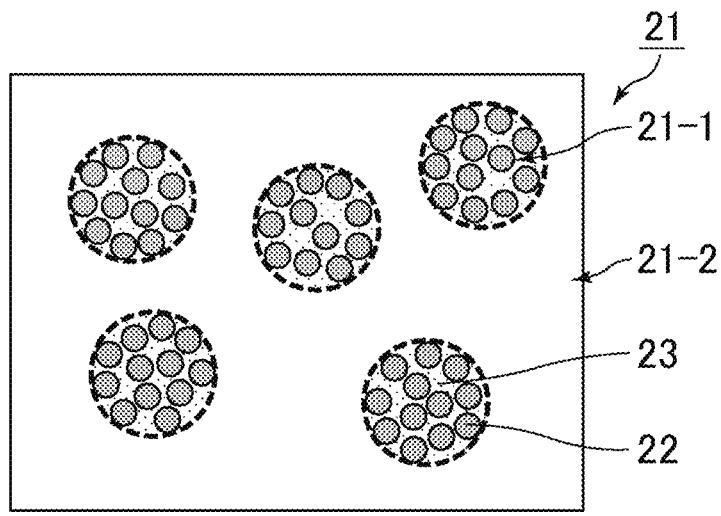
FIG. 10 is an enlarged schematic plan view of the region (i) in FIG. 9.
Figure 11:
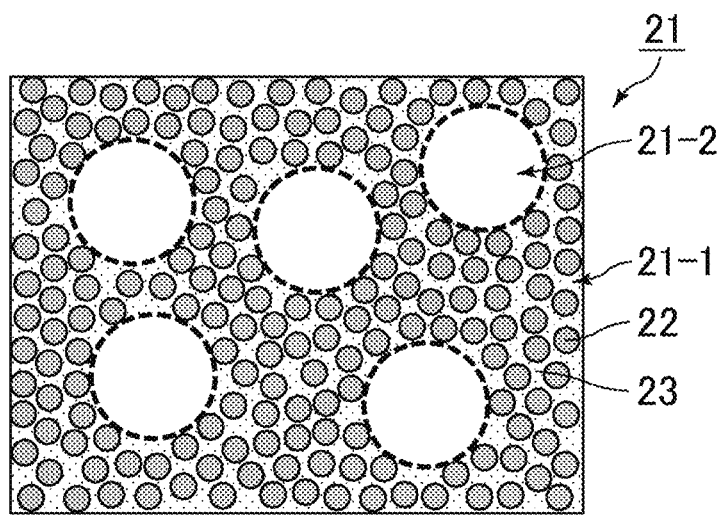
FIG. 11 is an enlarged schematic plan view of the region (ii) in FIG. 9.
Figure 12:
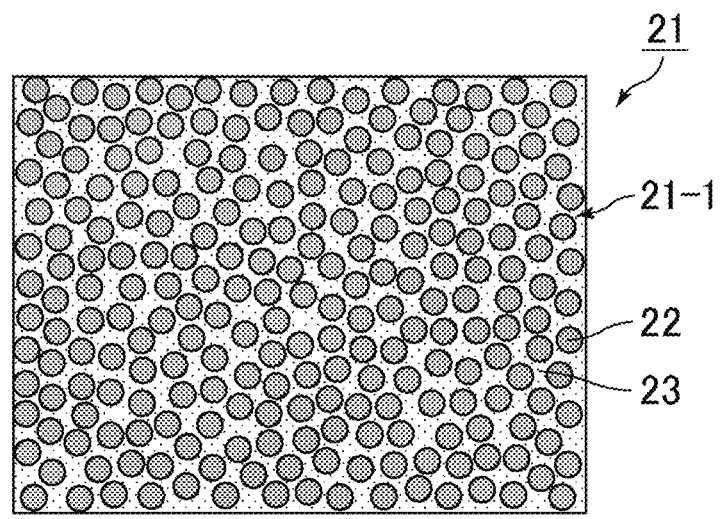
FIG. 12 is an enlarged schematic plan view of the region (iii) in FIG. 9.

In Embodiment 2, a method of shading a pattern or the like is described. The configurations of components other than the design layer are the same as in Embodiment 1, and thus description thereof is omitted. FIG. 9 is a schematic cross-sectional view showing an example of a display device of Embodiment 2. FIG. 9 is also a schematic plan view of the display device in the non-display state. A case is described where, as shown in FIG. 9, the color of the letters ABC is made darker from the top toward the bottom. FIG. 10, FIG. 11, and FIG. 12 are enlarged schematic plan views of regions (i), (ii), and (iii) in FIG. 9, respectively.

The design part 21 may not include the light-reflective colored particles 22 in its entire part as long as the pattern or the like to be perceived by the viewer is expressed in the non-display state. In Embodiment 2, the ratio between a region containing the light-reflective colored particles and a region not containing the light-reflective colored particles is changed to express color shades. As shown in FIG. 10 and FIG. 11, the design part 21 includes a region(s) 21-1 containing the light-reflective colored particles 22 and a region(s) 21-2 not containing the light-reflective colored particles 22. In the case of there are multiple regions 21-1, the area of the region 21-1 hereinbelow means the total area of the regions 21-1. The same applies to the case of regions 21-2.

In the region (i) where the color of the letter is light, the region 21-2 not containing the light-reflective colored particles is larger in area than the region 21-1 containing the light-reflective colored particles. As the color of the letter gets darker, the area of the region 21-1 containing the light-reflective colored particles increases while the area of the region 21-2 not containing the light-reflective colored particles decreases. In the region (ii), the area of the region 21-1 containing the light-reflective colored particles and the area of the region 21-2 not containing the light-reflective colored particles are inverted, so that the region 21-1 containing the light-reflective colored particles is larger in area than the region 21-2 not containing the light-reflective colored particles. The region (iii) where the color of the letter is darkest is occupied by only the region 21-1 containing the light-reflective colored particles.

The color shades can be printed by, for example, the area coverage modulation. The area coverage modulation is a method of expressing color shades by changing the number of ink dots per area. The printing method is preferably gravure printing, screen printing, inkjet printing, or another high-definition printing method.

Figure 13:
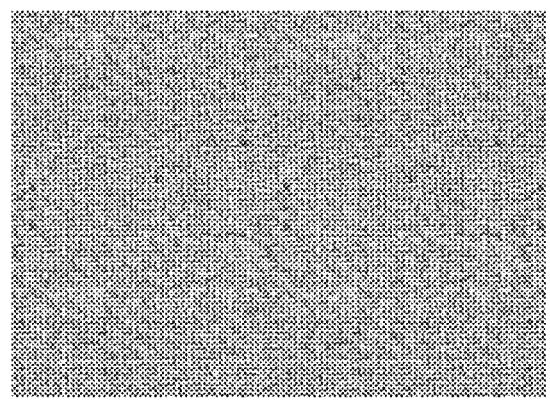
FIG. 13 is a schematic plan view showing a first example of a pattern or the like to be perceived in the non-display state in Embodiment 2.
Figure 14:
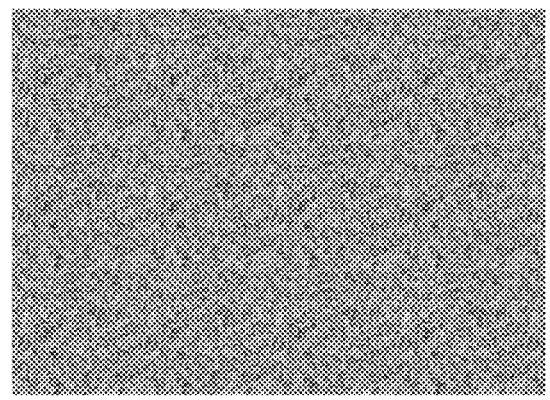
FIG. 14 is a schematic plan view showing a second example of a pattern or the like to be perceived in the non-display state in Embodiment 2.
Figure 15:
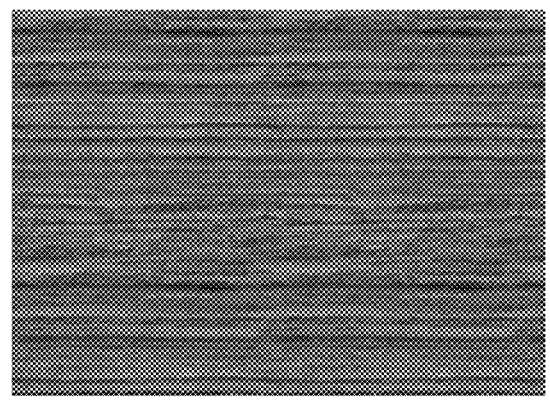
FIG. 15 is a schematic plan view showing a third example of a pattern or the like to be perceived in the non-display state in Embodiment 2.

FIG. 13, FIG. 14, and FIG. 15 are schematic plan views respectively showing first, second, and third examples of a pattern or the like to be perceived in Embodiment 2. According to Embodiment 2, shading allows expression of a woven-fabric pattern as shown in FIG. 13, a cork-like pattern as shown in FIG. 14, or a wood grain pattern as shown in FIG. 15, for example, even when the particles are light-reflective colored particles of a single color.

Embodiment 3

Figure 16:
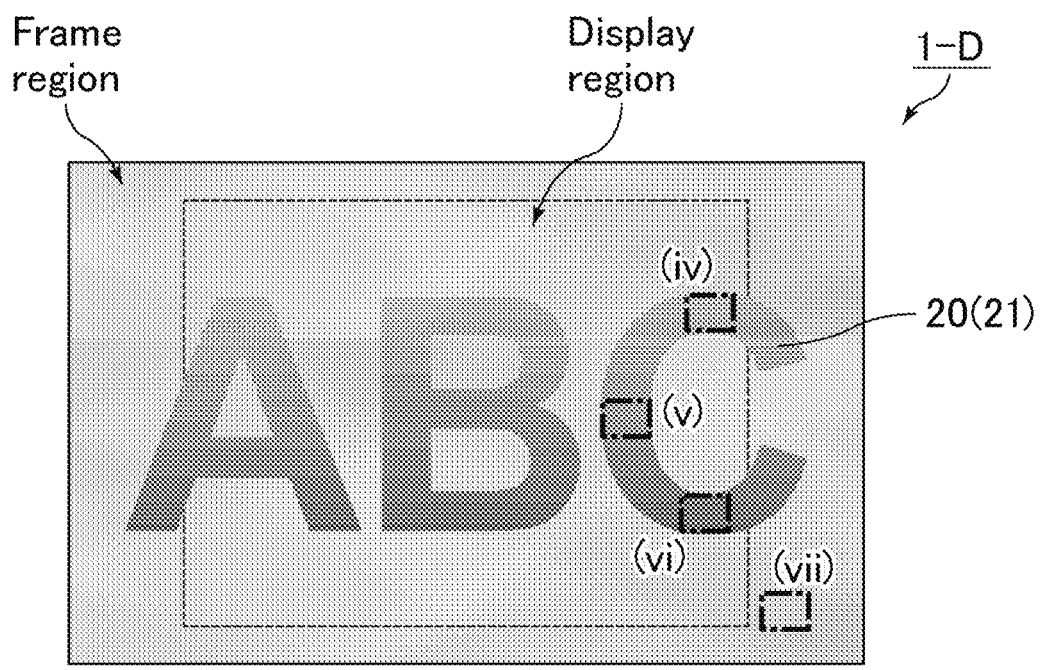
FIG. 16 is a schematic cross-sectional view showing an example of a display device of Embodiment 3.
Figure 17:
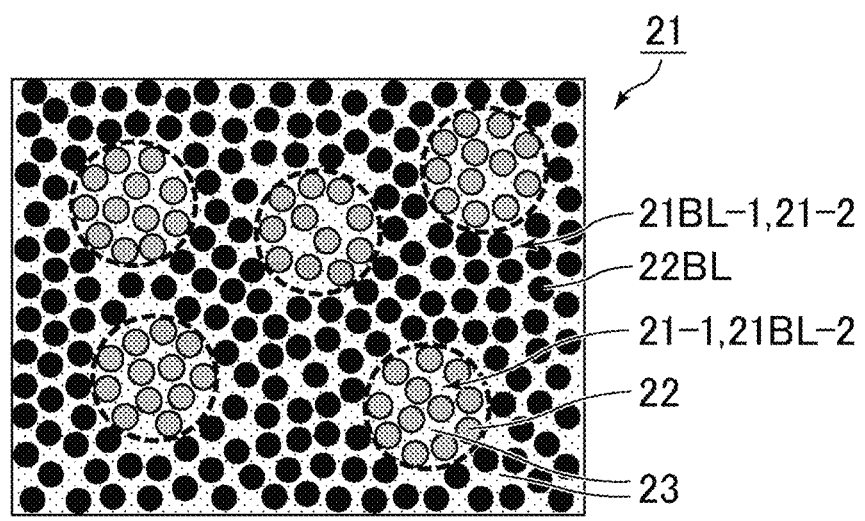
FIG. 17 is an enlarged schematic plan view of the region (iv) in FIG. 16.
Figure 18:
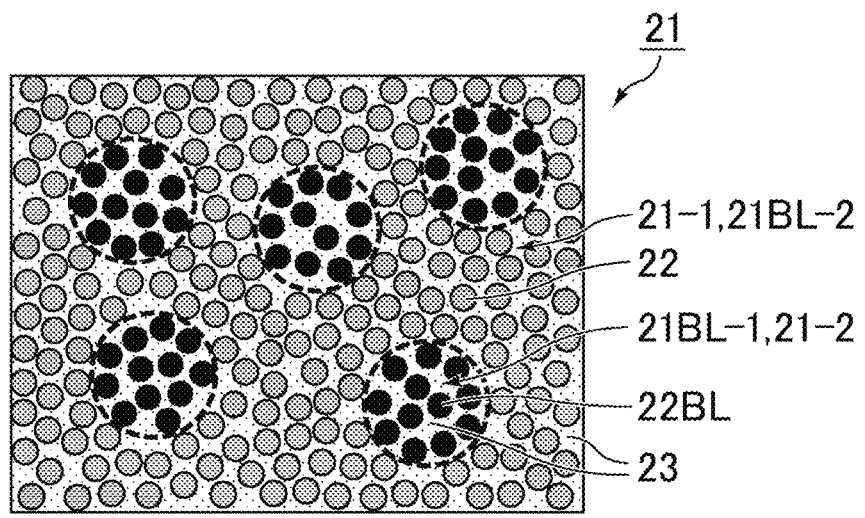
FIG. 18 is an enlarged schematic plan view of the region (v) in FIG. 16.
Figure 19:
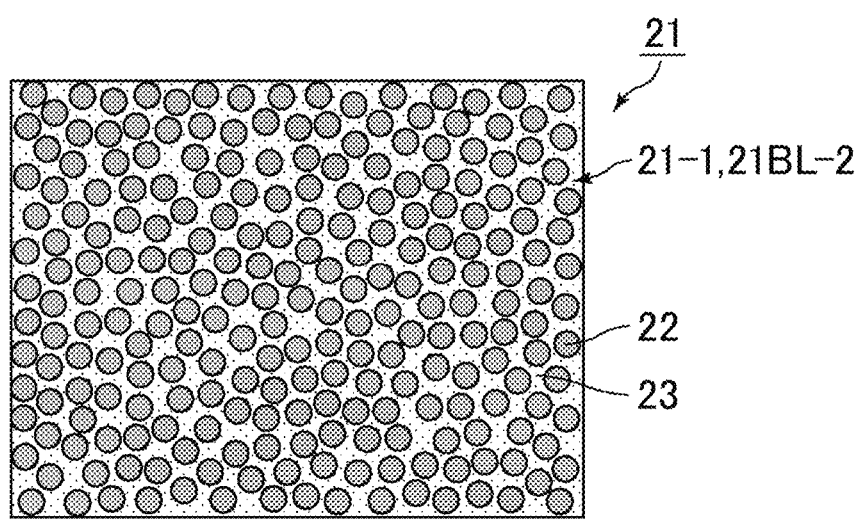
FIG. 19 is an enlarged schematic plan view of the region (vi) in FIG. 16.
Figure 20:
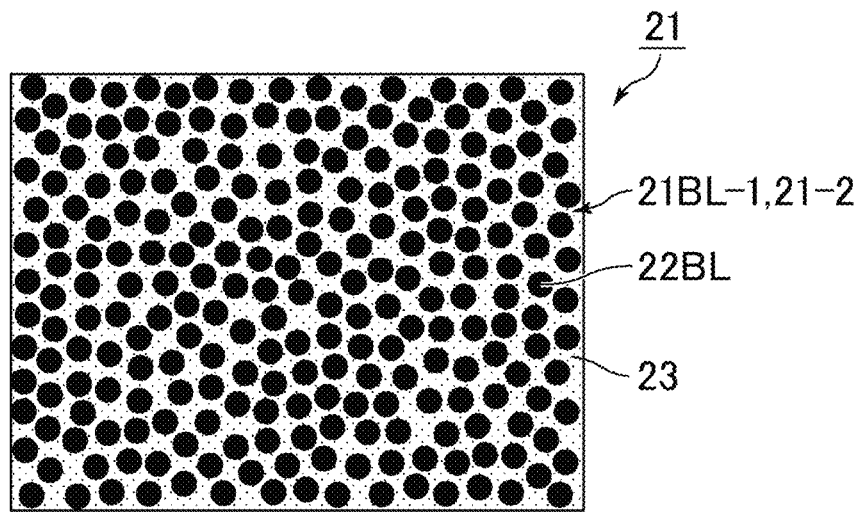
FIG. 20 is an enlarged schematic plan view of the region (vii) in FIG. 16.

Embodiment 3 can make the pattern or the like of the design part even less perceivable in the display state than Embodiment 2. FIG. 16 is a schematic cross-sectional view showing an example of a display device of Embodiment 3. FIG. 16 is also a schematic plan view of the display device in the non-display state. FIG. 17, FIG. 18, FIG. 19, and FIG. 20 are enlarged schematic plan views of regions (iv), (v), (vi), and (vii) in FIG. 16, respectively.

As shown in FIG. 16, the letters ABC to be perceived in the non-display state are the same as those in Embodiment 2 in that the color thereof gets darker from the top toward the bottom. As shown in FIG. 17 to FIG. 20, a design part 21 in a display device 1-D of Embodiment 3 includes a region(s) 21-1 containing light-reflective colored particles 22 and a region(s) 21-2 not containing the light-reflective colored particles 22, and further includes a region(s) 21BL-1 containing a black colored material 22BL and a region(s) 21BL-2 not containing the black colored material 22BL. Here, the light-reflective colored particles 22 are light-reflective colored particles of a color other than black. Also in Embodiment 3, the color shades are preferably printed by the area coverage modulation. As in Embodiment 2, in the case of there are multiple regions 21-1, the area of the region 21-1 hereinbelow means the total area of the regions 21-1. The same applies to the case of regions 21-2, regions 21BL-1, and regions 21BL-2.

In the region (iv) where the color of the letter is light, the region 21-2 not containing the light-reflective colored particles is larger in area than the region 21-1 containing the light-reflective colored particles. While the region 21-1 containing the light-reflective colored particles contains no black colored material 22BL, the region 21-2 not containing the light-reflective colored particles includes the region 21BL-1 containing the black colored material. In the region (iv), the region 21BL-1 containing the black colored material is larger in area than the region 21BL-2 not containing the black colored material.

As the color of the letter gets darker, the area of the region 21-1 containing the light-reflective colored particles increases, while the area of the region 21-2 not containing the light-reflective colored particles decreases. Meanwhile, the area of the region 21BL-1 containing the black colored material decreases, while the area of the region 21BL-2 not containing the black colored material increases. In the region (v), the area of the region 21-1 containing the light-reflective colored particles and the area of the region 21-2 not containing the light-reflective colored particles are inverted, so that the region 21-1 containing the light-reflective colored particles is larger in area than the region 21-2 not containing the light-reflective colored particles. The region 21BL-2 not containing the black colored material is larger in area than the region 21BL-1 containing the black colored material. The region (vi) where the color of the letter is darkest is occupied by only the region 21-1 containing the light-reflective colored particles and contains no black colored material 22BL. The non-letter surrounding region (vii) is occupied by only the region 21BL-1 containing the black colored material and includes no light-reflective colored particles 22.

As described above, the proportion of the region containing the black colored material 22BL is low in a region where the proportion of the region containing the light-reflective colored particles 22 is high, and the proportion of the region containing the black colored material 22BL is high in a region where the proportion of the region containing the light-reflective colored particles 22 is low.

When the light-reflective colored particles are used only for the letter part, depending on the concentration of the light-reflective colored particles, the transmittance in the display state may differ between the letter part and the non-letter surrounding region not containing the light-reflective colored particles. In Embodiment 3, the black colored material is disposed such that the shades of the light-reflective colored particles are inverted, so that the difference in transmittance in the plane of the display screen can be reduced and the design part can be less perceivable in the display state.

The black colored material may be an inorganic pigment such as carbon black. In terms of ease of adjustment of the transmittance of the design part 21, when the light-reflective colored particles 22 are those in which pieces of metal are coated with a pigment of a first color, the black colored material 22BL is preferably light-reflective black colored particles in which pieces of metal are coated with a black pigment. When the configurations, sizes, and other conditions are equalized between the light-reflective colored particles 22 and the black colored material 22BL, adjusting the amount of the black colored material 22BL to be added allows adjustment of the transmittance of the design part 21.

The concentration of the light-reflective black colored particles 22BL is preferably equivalent to the concentration of the light-reflective colored particles 22. For example, the difference between the concentration of the light-reflective colored particles 22 and the concentration of the light-reflective black colored particles 22BL in the binder resin 23 is preferably 5% by mass or less.

Embodiment 4

Figure 21:
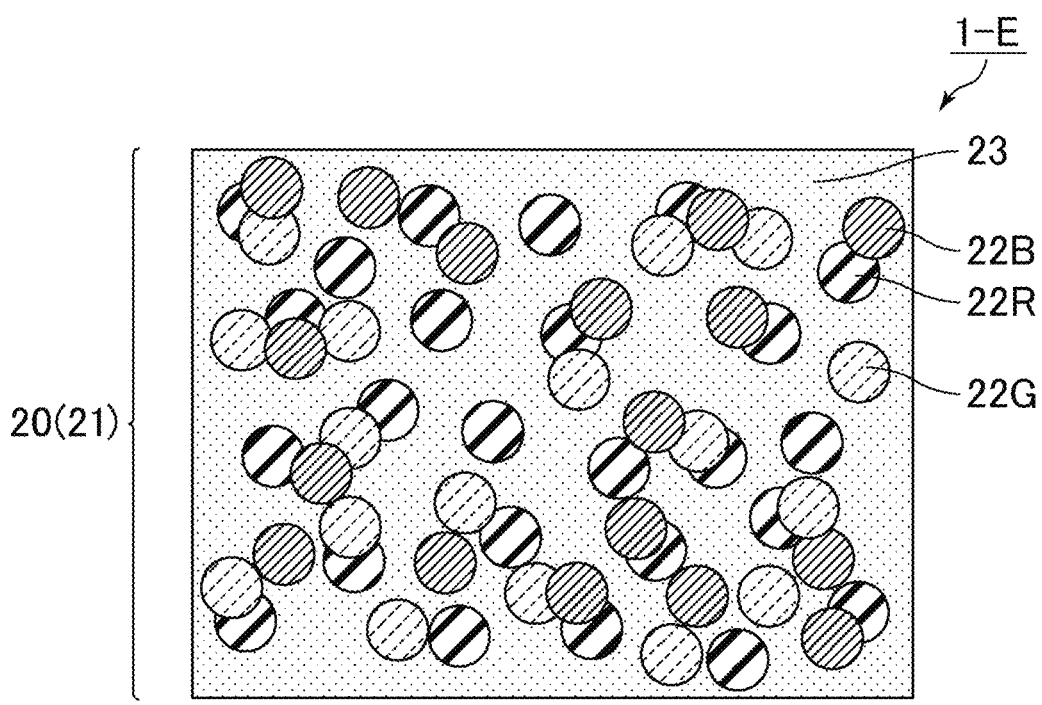
FIG. 21 is a partially enlarged schematic plan view of a design part in a display device of Embodiment 4.
Figure 22:
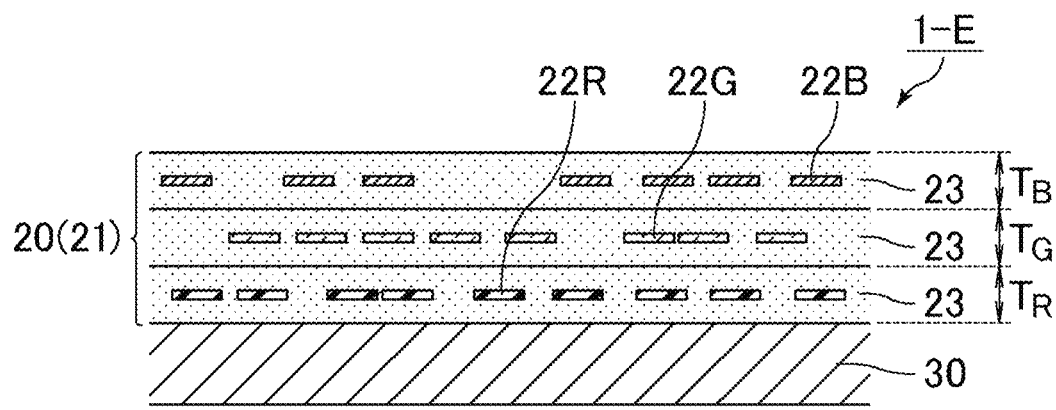
FIG. 22 is an example of a partially enlarged schematic cross-sectional view of the design part in the display device of Embodiment 4.

In Embodiment 4, a method of displaying the design part in color in the non-display state is described. The configurations of components other than the design layer are the same as in Embodiment 1, and thus description thereof is omitted. FIG. 21 is a partially enlarged schematic plan view of a design part in a display device of Embodiment 4. FIG. 22 is an example of a partially enlarged schematic cross-sectional view of the design part in the display device of Embodiment 4.

As shown in FIG. 21, a design part 21 in a display device 1-E of Embodiment 4 contains light-reflective colored particles of different colors. Also, as shown in FIG. 22, the design part 21 includes layers containing light-reflective colored particles of different colors stacked in the thickness direction. With the layers containing light-reflective colored particles of different colors stacked, the colors of the layers are combined by additive mixing when external light is reflected toward the viewer in the non-display state, which enables expression of the design part 21 in various colors.

The layers above may include a layer containing light-reflective red colored particles 22R, a layer containing light-reflective green colored particles 22G, and a layer containing light-reflective blue colored particles 22B. This configuration allows provision of full-color display.

In FIG. 22, an example is shown where the layer containing the light-reflective blue colored particles 22B, the layer containing the light-reflective green colored particles 22G, and the layer containing the light-reflective red colored particles 22R are stacked in this order from the viewer side. Yet, the layers may be stacked in any order.

In reflective display where external light is reflected, light of the color of the light-reflective colored particles contained in a lower layer is possibly blocked by the light-reflective colored particles in an upper layer. Thus, the amount of the light-reflective colored particles contained in a layer closer to the viewer is preferably smaller than the amount of the light-reflective colored particles contained in a layer farther from the viewer. In the case of the configuration in FIG. 22, since the layer containing the light-reflective blue colored particles is closest to the viewer, the viewer possibly strongly perceives the blue color. Thus, the amount of the light-reflective blue colored particles 22B is preferably smaller than the amounts of the light-reflective green colored particles 22G and the light-reflective red colored particles 22R. Also, the amount of the light-reflective green colored particles 22G is preferably smaller than the amount of the light-reflective red colored particles 22R.

The thickness $T_B$ of the layer containing the light-reflective blue colored particles 22B, the thickness $T_G$ of the layer containing the light-reflective green colored particles 22G, and the thickness $T_R$ of the layer containing the light-reflective red colored particles 22R may each be, for example, 10 μm or greater and 50 μm or smaller. The thicknesses of the layers may be the same as or different from one another.

Figure 23:
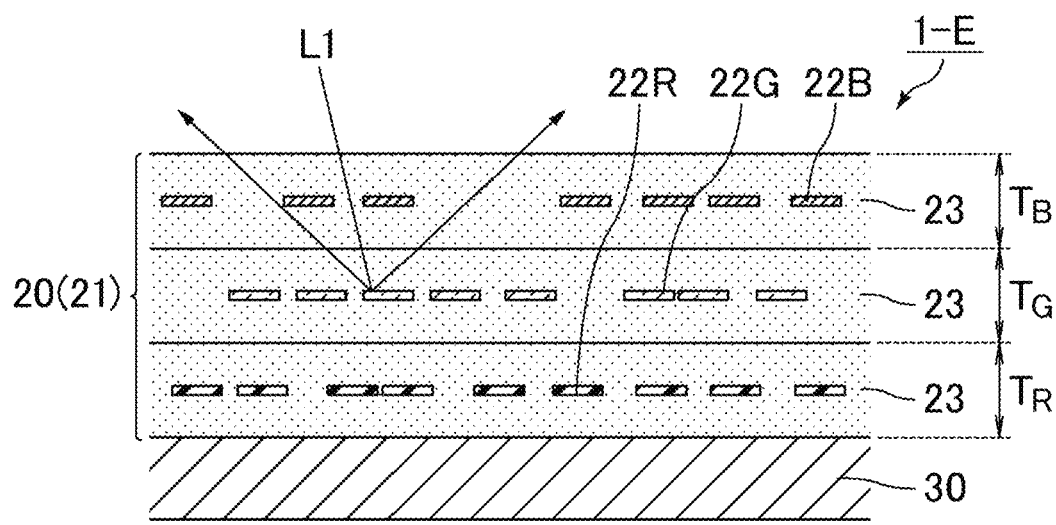
FIG. 23 is another example of a partially enlarged schematic cross-sectional view of the design part in the display device of Embodiment 4.

Another possible method is a method of increasing the thicknesses of the layers of the respective colors. FIG. 23 is another example of a partially enlarged schematic cross-sectional view of the design part in the display device of Embodiment 4. FIG. 23 shows an example where the thicknesses $T_B$, $T_G$, and $T_R$ of the layers respectively containing the light-reflective blue, green, and red colored particles are increased as compared with the case shown in FIG. 22. When the thicknesses $T_B$, $T_R$, and $T_G$ are increased, reflected light derived from external light L1 spreads more in the layers, so that light of the color of a lower layer is more likely to be emitted toward the viewer. The thicknesses $T_B$, $T_R$, and $T_G$ may each be, for example, 30 μm or greater. The thicknesses of the layers may be the same as or different from one another.

Yet another possible method is adding a white pigment or other light scattering particles into the resin binder, which also enables light of the color of a lower layer to be more likely to be emitted toward the viewer.

Embodiment 5

Figure 24:
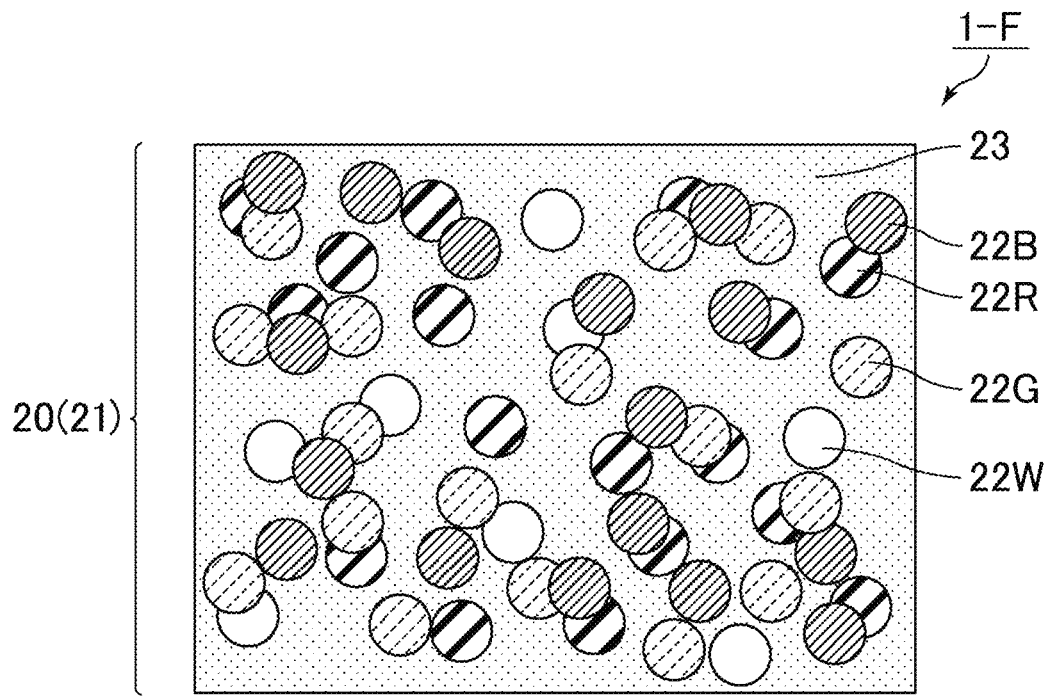
FIG. 24 is a partially enlarged schematic plan view of a design part in a display device of Embodiment 5.
Figure 25:
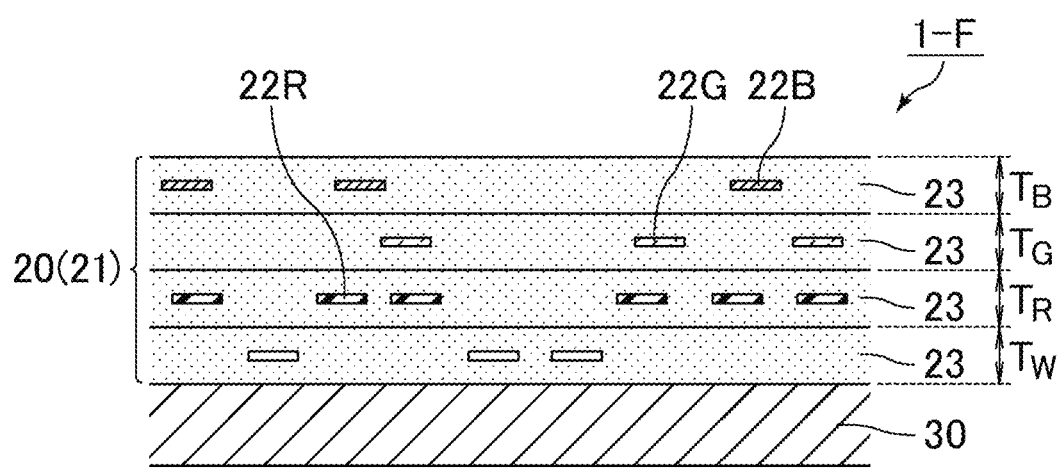
FIG. 25 is a partially enlarged schematic cross-sectional view of the design part in the display device of Embodiment 5.

In Embodiment 5, a method of vividly expressing the white color in the non-display state is described. FIG. 24 is a partially enlarged schematic plan view of a design part in a display device of Embodiment 5. FIG. 25 is a partially enlarged schematic cross-sectional view of the design part in the display device of Embodiment 5. As shown in FIG. 25, a design part 21 in a display device 1-F of Embodiment 5 includes layers containing light-reflective colored particles of different colors stacked in the thickness direction, the layers further including a layer containing light-reflective white colored particles 22W. The configurations are the same as in Embodiment 4 except that the layers include a layer containing the light-reflective white colored particles 22W, and thus description thereof is omitted.

The layers above may include a layer containing light-reflective red colored particles 22R, a layer containing light-reflective green colored particles 22G, and a layer containing light-reflective blue colored particles 22B. This configuration allows provision of full-color display.

As in Embodiment 4, with the layers containing light-reflective colored particles of different colors stacked, the design part 21 can be expressed in various colors in the non-display state by additive mixing. Meanwhile, although all the red, green, and blue colors need to be combined in order to display white by additive mixing, the color of the layer disposed on the viewer side is strongly reflected to color the light, which makes it difficult to express white. Thus, the layer containing the light-reflective white colored particles 22W is added to enable additive mixing of red, green, blue, and white of the four layers, so that the device allows the viewer to perceive white vividly in the non-display state.

Although the case is described where the layers containing the light-reflective blue, green, red, and white colored particles are stacked in this order from the viewer side, the layers may be stacked in any order.

Embodiment 6

Figure 26:
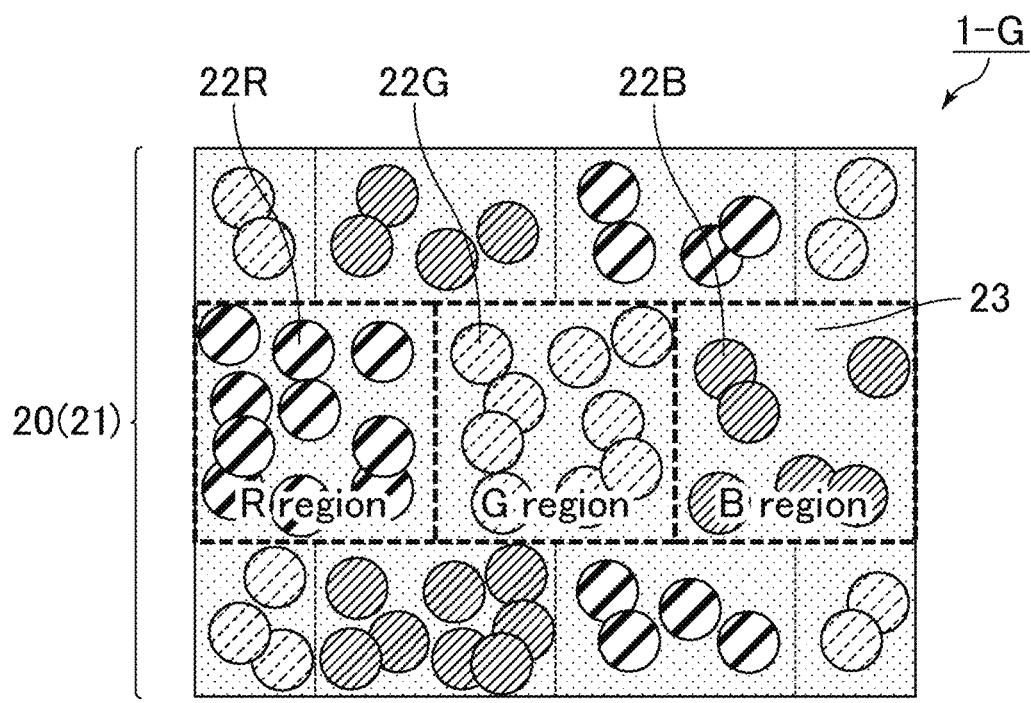
FIG. 26 is a partially enlarged schematic plan view of a design part in a display device of Embodiment 6.
Figure 27:
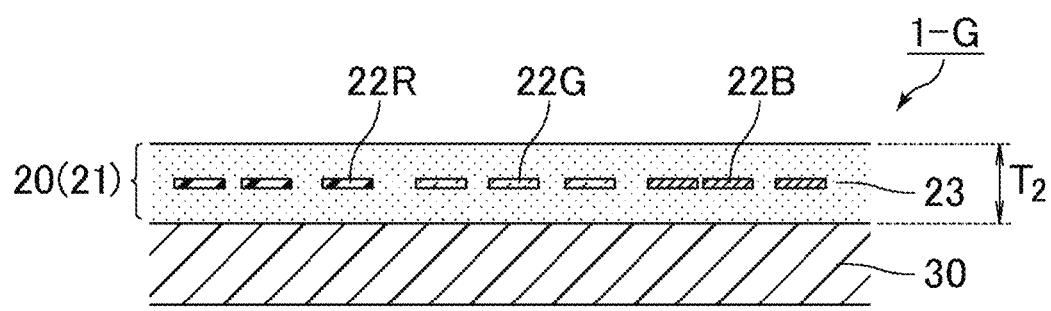
FIG. 27 is a partially enlarged schematic cross-sectional view of the design part in the display device of Embodiment 6.

In Embodiment 6, a method of displaying the design layer in color in the non-display state is described which is different from the methods in Embodiments 4 and 5. The configurations of components other than the design layer are the same as in Embodiment 1, and thus description thereof is omitted. FIG. 26 is a partially enlarged schematic plan view of a design part in a display device of Embodiment 6. FIG. 27 is a partially enlarged schematic cross-sectional view of the design part in the display device of Embodiment 6.

As shown in FIG. 26 and FIG. 27, a design part 21 in a display device 1-G of Embodiment 6 is divided in the in-plane direction into regions containing light-reflective colored particles of different colors. The light-reflective colored particles of different colors are not stacked as different layers as shown in Embodiments 4 and 5, but are arranged in a single design layer 20, with the light-reflective colored particles of different colors located in different regions by color. The light-reflective colored particles of different colors are not overlaid, so that the desired pattern or the like can be more accurately expressed in the non-display state. This configuration enables additive mixing of the colors of lights reflected by the regions containing the light-reflective colored particles of the respective colors in the non-display state, thus enabling expression of the design part 21 in various colors.

The thickness $T_2$ of the design layer 20 in Embodiment 6 is not limited and may be, for example, 10 μm or greater and 50 μm or smaller.

The regions above preferably include a region containing light-reflective red colored particles 22R (hereinafter, also referred to as a red region), a region containing light-reflective green colored particles 22G (hereinafter, also referred to as a green region), and a region containing light-reflective blue colored particles 22B (hereinafter, also referred to as a blue region). This configuration allows provision of full-color display. The regions of the respective colors can be displayed in grayscale by the area coverage modulation, so that the desired color can be expressed.

The regions above may further include a region containing light-reflective white colored particles 22W (hereinafter, also referred to as a white region). When the design part 21 consists of the three color regions of the red region, the green region, and the blue region, the reflectance of the design layer 21 in the non-display state is 33% at most. When the design part 21 consists of four color regions further including the white region, the reflectance of the design layer 21 in the non-display state can be made 33% or higher.

The design part 21 may include multiple red regions, multiple green regions, multiple blue regions, and multiple white regions. For additive mixing of these colors, the area of a single region of each color is preferably as small as invisible. For example, when the distance between the viewer and the display device is 1 m or shorter and each single region has a square shape, one side of a single region is preferably 200 μm or shorter. A single region may have a shape other than the square shape, such as a rectangular shape, a rhomboidal shape, or a hexagonal shape. Single regions may have a repetition period of 200 μm or shorter. The repetition period means the shortest centroid-to-centroid distance between adjacent regions. For example, in FIG. 29 described below, the distance between the centroid of a red region R and the centroid of a green region G adjacent to the red region R in the row direction corresponds to the repetition period. When the viewer sees the display device from a distance, a single region may have the above size or greater.

A single red region, a single green region, and a single blue region preferably have substantially equal areas. The difference between a single red region, a single green region, and a single blue region is, for example, 5% or less. The area of a white region may not be equivalent to the areas of a red region, a green region, and a blue region, and may optionally be adjusted as appropriate.

Figure 28:
FIG. 28 is a schematic plan view showing a method of arranging red regions, green regions, and blue regions in the design part shown in FIG. 26.
Figure 29:
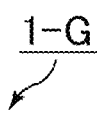
FIG. 29 is a schematic plan view showing a case where red regions, green regions, and blue regions are arranged in a striped pattern in Embodiment 6.

The method of arranging regions of the respective colors when the design part 21 includes red regions, green regions, and blue regions is not limited. The arrangement method may be one known in the field of display devices. For example, a delta pattern, a stripe pattern, or a mosaic pattern may be used. FIG. 28 is a schematic plan view showing a method of arranging red regions, green regions, and blue regions in the design part shown in FIG. 26. FIG. 29 is a schematic plan view showing a case where red regions, green regions, and blue regions are arranged in a striped pattern in Embodiment 6. In FIG. 28 and FIG. 29, R represents a red region, G represents a green region, and B represents a blue region.

Examples of the delta pattern arrangement include a method of repetitively arranging red regions, green regions, and blue regions in the row direction, with the regions in adjacent columns being shifted by half a pitch in the column direction. Examples of the strip pattern arrangement include a method of repetitively arranging red regions, green regions, and blue regions in the row direction, with the regions of the same color being arranged in the column direction. Examples of the mosaic pattern arrangement include a method of repetitively arranging red regions, green regions, and blue regions in the row direction, with the regions in adjacent columns being shifted by one pitch in the row direction.

Figure 30:
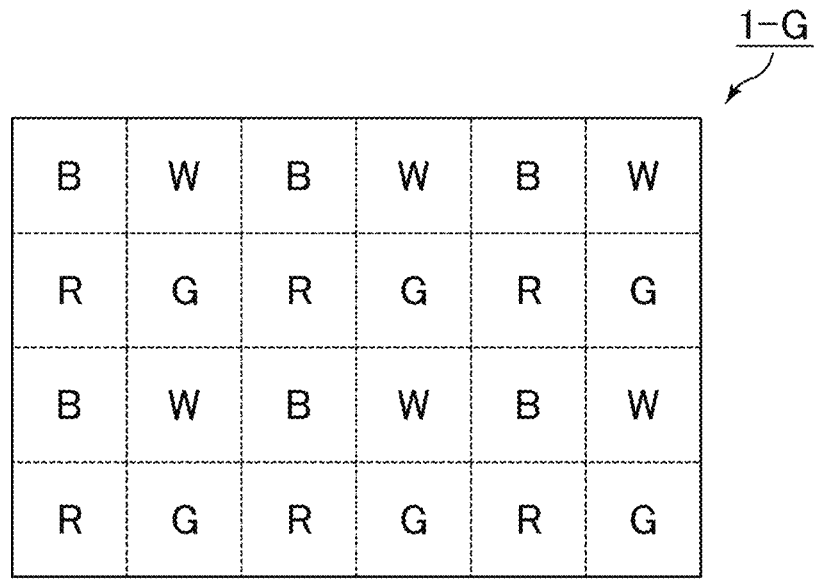
FIG. 30 is a schematic plan view showing a method of arranging red regions, green regions, blue regions, and white regions in the design part in Embodiment 6.

FIG. 30 is a schematic plan view showing a method of arranging red regions, green regions, blue regions, and white regions in the design part in Embodiment 6. In FIG. 30, R represents a red region, G represents a green region, B represents a blue region, and W represents a white region. The method of arranging regions of respective colors when the design part 21 includes red regions, green regions, blue regions, and white regions is not limited. Examples of the method include, as shown in FIG. 30, a method in which the design part includes first rows alternately including blue regions and white regions in the row direction and second rows alternately including red regions and green regions in the row direction, and the first rows and the second rows are alternately arranged in the column direction.

Embodiment 7

Figure 31:
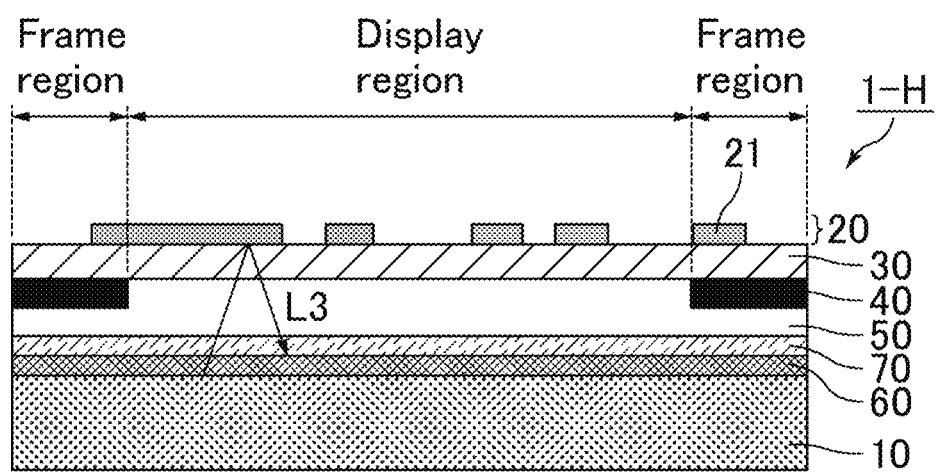
FIG. 31 is a schematic cross-sectional view showing an example of a display device of Embodiment 7.

FIG. 31 is a schematic cross-sectional view showing an example of a display device of Embodiment 7. As shown in FIG. 31, a display device 1-H of Embodiment 7 includes between a display panel 10 and a design layer 20 a polarizer 60 and a phase difference plate 70 sequentially from the display panel 10 side. The configurations are the same as in Embodiment 1 except that the polarizer 60 and the phase difference plate 70 are included, and thus description thereof is omitted. The concept of Embodiment 7 can be appropriately combined with the concepts of Embodiments 1 to 6.

Most part of light emitted from the display panel 10 side in the display state is emitted toward the viewer to display the desired image. However, part of light emitted from the display panel 10 side is possibly reflected by light-reflective colored particles 22 in the design part 21 to return toward the display panel 10. Light returning to the display panel 10 acts as stray light inside the display panel 10, which may decrease the contrast ratio of the display device or cause a change in chromaticity. Thus, in Embodiment 7, between the display panel 10 and the design layer 20, the polarizer 60 and the phase difference plate 70 are arranged in order from the display panel 10 side. This configuration causes light reflected by the light-reflective colored particles 22 toward the display panel 10 to be absorbed by the polarizer 60, and thus prevents light from entering the inside of the display panel 10 from the viewer side.

The polarizer 60 is not limited and may be one usually used in the field of display devices. The polarizer 60 is preferably a linear polarizer, more preferably an absorptive polarizer. An absorptive polarizer has a transmission axis that transmits light vibrating in a specific direction and an absorption axis that is orthogonal to the transmission axis, to transmit incident polarized light vibrating in the transmission axis direction and absorb incident polarized light vibrating in the absorption axis direction.

The phase difference plate 70 is a component that introduces a phase difference to incident light. The phase difference plate 70 is preferably a quarter-wave plate. A quarter-wave plate is a phase difference plate that introduces an in-plane phase difference of a quarter of a wavelength (precisely, 137.5 nm) to light with a wavelength of 550 nm, for example. The in-plane phase difference to be introduced is 120 nm or more and 150 nm or less.

The quarter-wave plate may have a fast axis and a slow axis orthogonal to the fast axis. The quarter-wave plate is preferably disposed such that its fast axis forms an angle of substantially 45° with the transmission axis of the polarizer 60. The angle of substantially 45° is preferably an angle falling within the range of 45°±3°, more preferably the range of 45°±1°, still more preferably the range of 45°±0.5°. Combination use a linear polarizer and a quarter-wave plate enables them to function as a circular polarizer, and thus allows more effective prevention of entry of light from the viewer side into the display panel 10.

Embodiment 8

Figure 32:
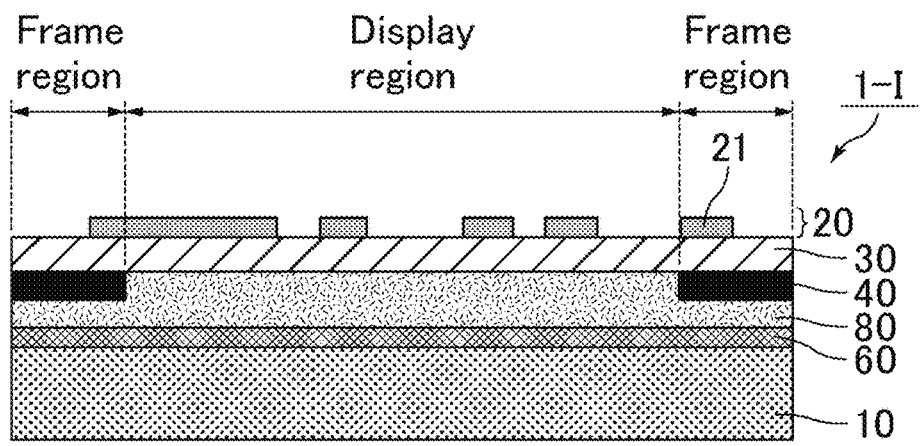
FIG. 32 is a schematic cross-sectional view showing an example of a display device of Embodiment 8.

FIG. 32 is a schematic cross-sectional view showing an example of a display device of Embodiment 8. A display device 1-I of Embodiment 8 includes no air layer between a display panel and a design layer. As shown in FIG. 32, the display device includes a transparent base material 30 in front of the front surface side of the display panel 10, and the display panel 10 and the transparent base material 30 may be attached to each other by an optical adhesive layer 80.

As described above, part of light emitted from the display panel 10 side is possibly reflected by light-reflective colored particles 22 in a design part 21 and to return to the display panel 10. With an air layer between the display panel 10 and the design layer, light returned toward the display panel may possibly be reflected at the interface between the back surface side of the transparent base material 30 and an adjacent layer or at the interface between the front surface side of the display panel 10 and an adjacent layer to decrease the contrast ratio of the display device. The optical adhesive layer 80 between the display panel 10 and the transparent base material 30 allows reduction or prevention of such interfacial reflection, thus reducing or preventing a decrease in contrast ratio.

The optical adhesive layer 80 can be one usually used for attachment of optical components in the field of display devices. The total light transmittance of the optical adhesive layer 80 is preferably 90% or higher, and the haze of the optical adhesive layer 80 is preferably 10% or lower, for example. The refractive index of the optical adhesive layer 80 is preferably higher than the refractive index of the air layer. The optical adhesive layer 80 may be, for example, the optical clear adhesive tape LUCIACS available from Nitto Denko Corporation.

Embodiment 9

Figure 33:
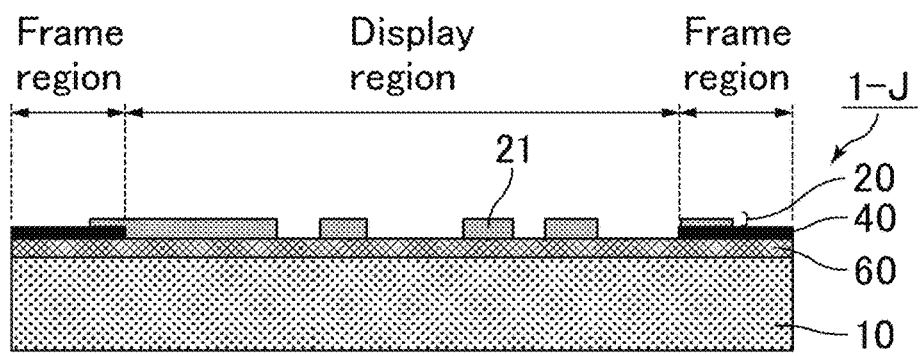
FIG. 33 is a schematic cross-sectional view showing an example of a display device of Embodiment 9.
Figure 34:
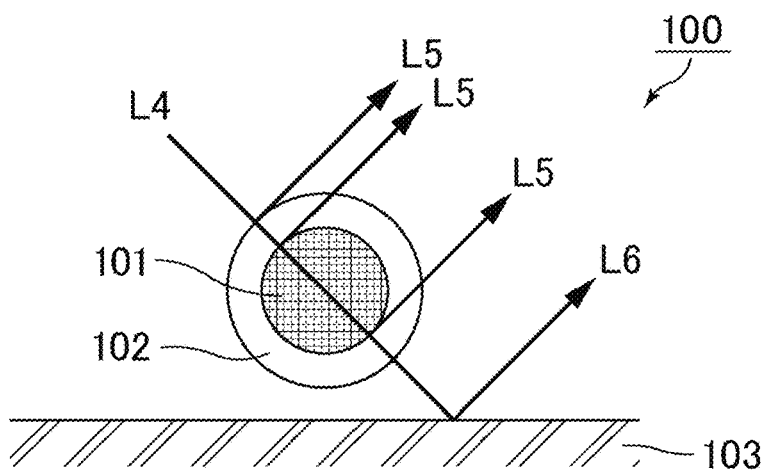
FIG. 34 is a schematic cross-sectional view showing a conventional interference pigment.

FIG. 33 is a schematic cross-sectional view showing an example of a display device of Embodiment 9. Embodiment 9 relates to a method of reducing or preventing a decrease in contrast ratio and is different from the method in Embodiment 8. As shown in FIG. 33, a display device 1-J of Embodiment 9 includes a polarizer 60 on the front surface side of a display panel 10 and a design layer 20 on the front surface side or the back surface side of the polarizer 60. A design part 21 may be directly printed on the front surface side or the back surface side of the polarizer 60 and may be in contact with the polarizer 60.

Since no air layer is disposed between the design layer 20 and the display panel 10 in Embodiment 9, part of light emitted from the display panel 10 side does not undergo interfacial reflection even when reflected by the light-reflective colored particles 22 in the design part 21. This allows reduction or prevention of a decrease in contrast ratio.

The display devices of Embodiments 1 to 9, for example, may be used as an instrument panel of a vehicle to display instruments such as a speedometer, or may be used as a control panel of a home electrical appliance.

REFERENCE SIGNS LIST

1-A, 1-B, 1-C, 1-D, 1-E, 1-F, 1-G, 1-H, 1-I, 1-J: display device
10: display panel
20: design layer
21: design part
21-1: region containing light-reflective colored particles
21-2: region not containing light-reflective colored particles
21BL-1: region containing black colored material
21BL-2: region not containing black colored material
22, 22-1, 22-2: light-reflective colored particles
22B: light-reflective blue colored particles
22BL: black colored material (light-reflective black colored particles)
22G: light-reflective green colored particles
22R: light-reflective red colored particles
22W: light-reflective white colored particles
22a: piece of metal
22b: pigment
23: binder resin
30: transparent base material
40: black layer
50: air layer
60: polarizer
70: phase difference plate
80: optical adhesive layer
100: interference pigment
101: base material
102: coating layer
103: base film

What is claimed is:

1. A display device comprising:
a dot matrix display panel; and
a design layer disposed in front of a viewer side of the dot matrix display panel,
wherein:
the design layer is configured to transmit light emitted from a dot matrix display panel side and includes a design part that includes a binder resin and light-reflective colored particles dispersed in the binder resin,
the light-reflective colored particles reflect light having a specific wavelength in a visible spectrum while absorbing light having a wavelength other than the specific wavelength in the visible spectrum,
in a reflective display state in which no light is emitted from the dot matrix display panel side, the display device reflects external light to the viewer side and allows a viewer to observe a pattern of the design part, and
in a display state in which light is emitted from the dot matrix display panel side and then transmitted through the design layer, the display device displays an image without allowing the viewer to perceive a complementary color of a color perceived by the viewer in the reflective display state.

2. The display device according to claim 1,
wherein each of the light-reflective colored particles includes a piece of metal coated with a pigment.

3. The display device according to claim 1,
wherein the light-reflective colored particles include light-reflective colored particles of two or more colors that include pigment coatings of different colors.

4. The display device according to claim 1,
wherein an average particle size of the light-reflective colored particles is 30 µm or smaller.

5. The display device according to claim 1,
wherein the design part includes a region containing the light-reflective colored particles and a region not containing the light-reflective colored particles, and
a ratio between the region containing the light-reflective colored particles and the region not containing the light-reflective colored particles is changed to express color shades.

6. The display device according to claim 5,
wherein the design part further includes a region containing a black colored material and a region not containing the black colored material, and
a proportion of the region containing the black colored material is low in a region in which a proportion of the region containing the light-reflective colored particles is high, and a proportion of the region containing the black colored material is high in a region in which a proportion of the region containing the light-reflective colored particles is low.

7. The display device according to claim 6,
wherein each of the light-reflective colored particles includes a piece of metal coated with a pigment of a first color, the black colored material includes black colored particles, each including a piece of the metal coated with a black pigment, and
a difference in concentration between the light-reflective colored particles and the black colored particles in the binder resin is 5% by mass or less.

8. The display device according to claim 1,
wherein the design part includes light-reflective colored particles of different colors that are stacked on top of one another within the binder resin in a thickness direction of the design part.

9. The display device according to claim 8,
wherein the light-reflective colored particles of different colors include light-reflective red colored particles, light-reflective green colored particles, and light-reflective blue colored particles.

10. The display device according to claim 9,
wherein the light-reflective colored particles of different colors further include light-reflective white colored particles.

11. The display device according to claim 1,
wherein the design part is divided in an in-plane direction into regions containing light-reflective colored particles of different colors.

12. The display device according to claim 1,
wherein the display device includes no air layer between the dot matrix display panel and the design layer.

13. The display device according to claim 1, further comprising:
a transparent base material disposed in front of the viewer side of the dot matrix display panel, wherein
the design layer is on a viewer side or a back surface side of the transparent base material.

14. The display device according to claim 1, further comprising:
a polarizer and a phase difference plate sequentially from the dot matrix display panel side between the dot matrix display panel and the design layer.

15. The display device according to claim 1, further comprising:
a polarizer in front of the viewer side of the dot matrix display panel, wherein
the design layer is on a viewer side or a back surface side of the polarizer.

16. The display device according to claim 1,
wherein the light-reflective colored particles absorb any light having a wavelength in the visible spectrum other than the specific wavelength without transmitting the light.

17. The display device according to claim 1,
wherein the design part overlaps a display region of the dot matrix display panel in a plan view.

* * * * *